(12) United States Patent
Emejulu et al.

(10) Patent No.: US 10,467,032 B2
(45) Date of Patent: Nov. 5, 2019

(54) DYNAMIC CLOUD IMAGE UPDATES BASED ON SUBJECTIVE CUSTOMIZATION AND USER INPUT

(71) Applicant: International Business Machines Corporation, Armonk, NY (US)

(72) Inventors: Nnaemeka I. Emejulu, Austin, TX (US); Andrew J. Lavery, Austin, TX (US); Mario A. Maldari, Lyons, CO (US); Karthikeyan Ramamoorthy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 209 days.

(21) Appl. No.: 15/448,207

(22) Filed: Mar. 2, 2017

(65) Prior Publication Data
US 2018/0253320 A1   Sep. 6, 2018

(51) Int. Cl.
| | |
|---|---|
| *G06F 3/0481* | (2013.01) |
| *G06F 9/451* | (2018.01) |
| *G06F 9/455* | (2018.01) |
| *G06F 16/51* | (2019.01) |
| *G06F 16/583* | (2019.01) |
| *G06F 8/61* | (2018.01) |
| *G06F 9/445* | (2018.01) |
| *G06Q 30/02* | (2012.01) |

(52) U.S. Cl.
CPC .......... *G06F 9/452* (2018.02); *G06F 3/04817* (2013.01); *G06F 8/63* (2013.01); *G06F 9/44505* (2013.01); *G06F 9/45558* (2013.01); *G06F 16/51* (2019.01); *G06F 16/583* (2019.01); *G06F 2009/4557* (2013.01); *G06F 2009/45562* (2013.01); *G06Q 30/0282* (2013.01)

(58) Field of Classification Search
CPC .. G06F 3/04817; G06F 3/0484; G06F 3/0488; G06Q 30/0282
See application file for complete search history.

(56) References Cited

U.S. PATENT DOCUMENTS

| | | | |
|---|---|---|---|
| 8,214,238 B1* | 7/2012 | Fairfield | G06Q 10/063 705/7.11 |
| 8,543,157 B1* | 9/2013 | Fujisaki | H04M 1/64 379/142.1 |
| 9,584,874 B1* | 2/2017 | Farias | H04N 21/25883 |

(Continued)

OTHER PUBLICATIONS

Cacciatore, Kathy et al., "Exploring Opportunities: Containers and OpenStack", OpenStack, OpenStack White Paper 19, (month unknown) 2015, 19 pages.

(Continued)

*Primary Examiner* — Steven P Sax
(74) *Attorney, Agent, or Firm* — Stephen R. Tkacs; Stephen J. Walder, Jr.; Christopher Pignate

(57) ABSTRACT

A mechanism is provided for use with a set of images including a first image, with each image of the set of images respectively representing a computer and respectively including software and configuration settings data. The mechanism deploys a plurality of first image instantiations of the first image for respective use by a plurality of users. The mechanism tracks use of the plurality of first image instantiations to create a historical usage data set indicative of how the plurality of users are customizing the plurality of first image instantiations.

14 Claims, 9 Drawing Sheets

(56) References Cited

U.S. PATENT DOCUMENTS

| | | | |
|---|---|---|---|
| 10,295,982 B2* | 5/2019 | Nikhra | G05B 19/0428 |
| 2003/0120391 A1* | 6/2003 | Saito | B25J 9/1671 |
| | | | 700/264 |
| 2011/0055714 A1* | 3/2011 | Vemulapalli | G06F 9/5077 |
| | | | 715/739 |
| 2013/0132824 A1 | 5/2013 | Dalal et al. | |
| 2015/0081910 A1* | 3/2015 | Assuncao | G06F 9/45558 |
| | | | 709/226 |
| 2015/0135043 A1* | 5/2015 | Apps | G06Q 10/10 |
| | | | 715/202 |
| 2015/0194136 A1* | 7/2015 | Diard | G09G 5/393 |
| | | | 345/547 |
| 2015/0304186 A1* | 10/2015 | O'Sullivan | G06F 16/22 |
| | | | 709/224 |
| 2015/0379608 A1* | 12/2015 | Dorner | G06Q 30/0631 |
| | | | 705/26.7 |
| 2016/0232025 A1 | 8/2016 | Speak et al. | |
| 2017/0064015 A1* | 3/2017 | Davis | H04L 67/18 |
| 2017/0148072 A1* | 5/2017 | Goodwin | G06Q 20/102 |
| 2017/0214701 A1* | 7/2017 | Hasan | H04L 63/1408 |
| 2017/0251068 A1* | 8/2017 | Kappler | H04L 67/18 |

OTHER PUBLICATIONS

Chen, Haibo et al., "Live updating operating systems using virtualization" Proceedings of the 2nd international conference on Virtual Execution Environments, VEE'06, Ottawa, Ontario, Canada, Jun. 14-16, 2006, pp. 35-44.

Coghlan, Susan, "The Magellan Final Report on Cloud Computing", eScholarship, University of California, https://escholarship.org/uc/item/8851p5p9, Lawrence Berkeley National Laboratory, Jan. 11, 2013, 172 pages.

Corbet, Jonathan et al., "Linux Kernel Development: How Fast it is Going, Who is Doing it, What They are Doing, and Who is Sponsoring It", A White paper by the Linux Foundation, http://www.linuxfoundation.org, Dec. 2010, 20 pages.

Kashiwagi, K et al., "Design and implementation of dynamically reconstructing system software", Google Scholar, Google Patents, https://patents.google.com/scholar/940051961601034792?q=open+source&q=kernel&q=update&q=improvement&scholar&page=4, Dec. 1996, 4 pages.

Soules, Craig A. et al., "System Support for Online Reconfiguration", USENIX, http://static.usenix.org/legacy/events/usenix03/tech/full_papers/soules/soules_html/, USENIX 2003 Annual Technical Conference, General Track—Paper, Jun. 9, 2003, 27 pages.

\* cited by examiner

FIG. 5B

```
                AutoCAD®
                 Survey

Please provide feedback (5 stars are best)

1. Performance and Responsiveness    ★★☆☆☆  ⎫
                                              ⎪
  2. User Interface Customizations     ★★★★★  ⎬ 502
     (font sizes, layout, etc.)               ⎪
                                              ⎭
  3. Design Templates Installed        ★★★★☆

| Item | My Vote | Key Changes Made |
|---|---|---|
| Images | | |
| Virtual Box with Windows 10 (entire image) | ★★★★★ | UI Customizations, Security Updates |
| Ubuntu 16.04.1 LTS (entire image) | ☆☆☆☆☆ | UI Customizations |
| Application Components | | |
| AutoCAD® | ★★★★★ | Performance Updates, UI Customizations |
| Linux Kernel 4.8-rc4 (built-in driver support for RX480 GPUs) | ★★★☆☆ | Driver updates |
| Libre Office with Accounting Template | ☆☆☆☆☆ | Template additions |
| Wireshark with custom protocol | ☆☆☆☆☆ | Protocol configurations |
| Websstorm with custom download feature | ☆☆☆☆☆ | Download plugin addition |

Columns: 601 (Item), 602 (My Vote), 603 (Key Changes Made)

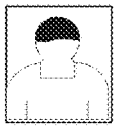

FIG. 7A

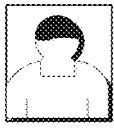

| Item | Rating | User Providing Rating | Type of Feedback | Date of Feedback |
|---|---|---|---|---|
| Eclipse Juno 4.7 | ★★★★★ | Mary Engineer | Survey | 2016-06-30 |
| Eclipse Juno 4.7 | ★★★★★ | Bill Engineer | Survey | 2016-06-27 |
| Eclipse Juno 4.7 | ★★★★☆ | Pat Engineer | Vote | 2016-01-14 |
| Eclipse Luna 5.0 | ★★☆☆☆ | Mary Engineer | Survey | 2016-06-28 |
| AutoCAD® 10.7 | ★★★★★ | John Architect | Survey | 2015-10-09 |
| AutoCAD® 10.7 | ★★★★☆ | Mary Engineer | Vote | 2015-10-20 |
| AutoCAD® 10.6 | ★☆☆☆☆ | John Architect | Vote | 2015-01-04 |
| Mac OS X El Capitan | ★★★★★ | Mary Engineer | Survey | 2016-03-15 |
| ... | ... | ... | ... | ... |

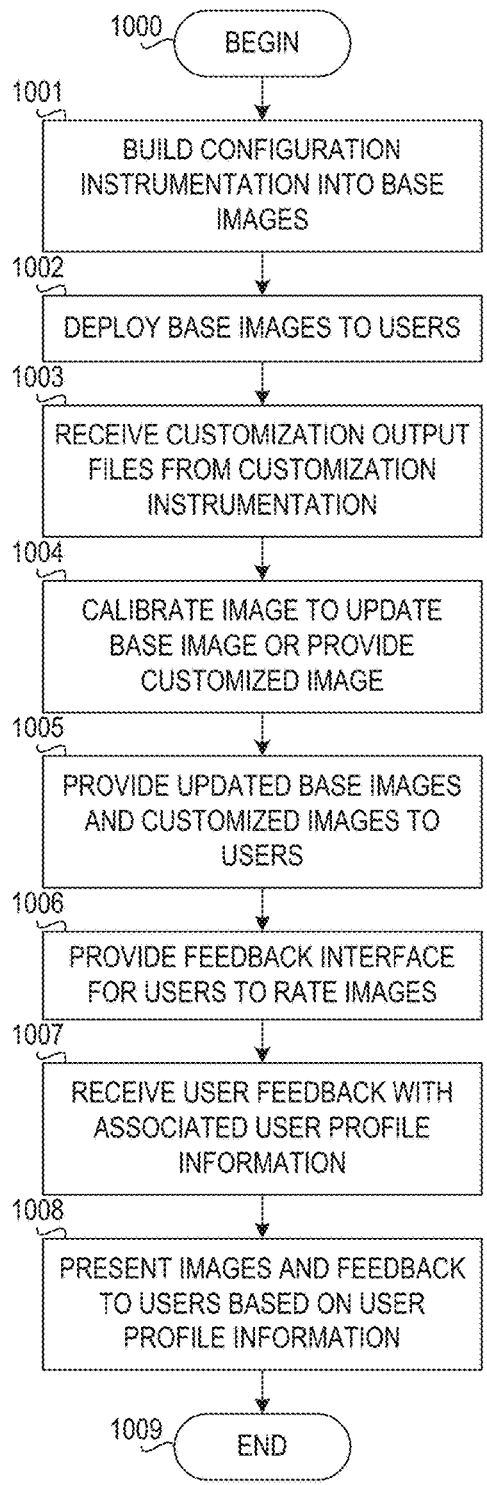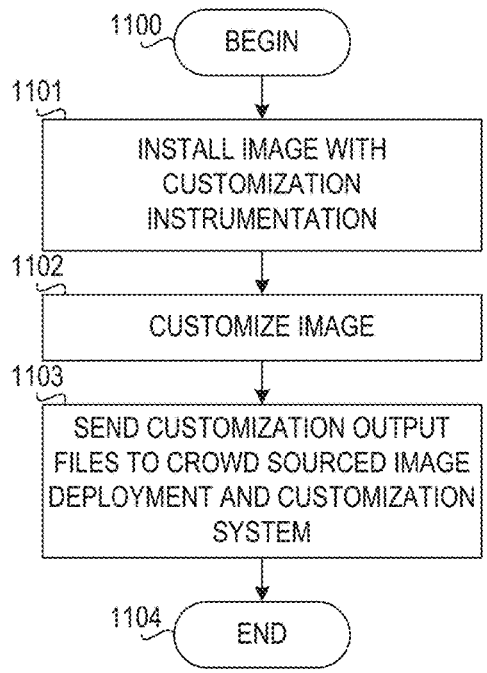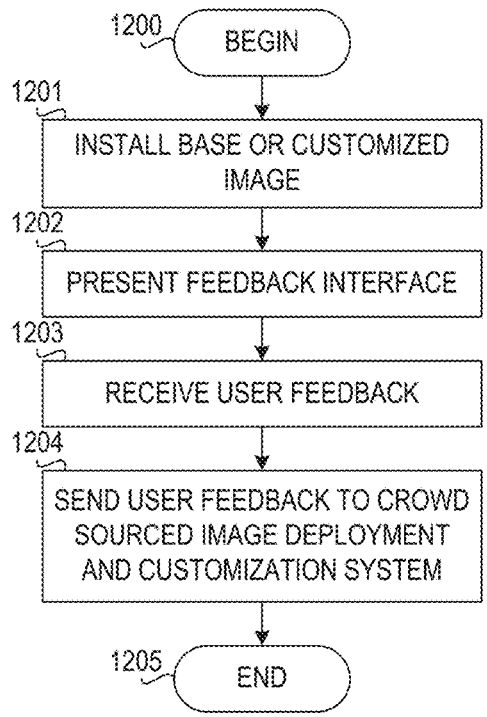

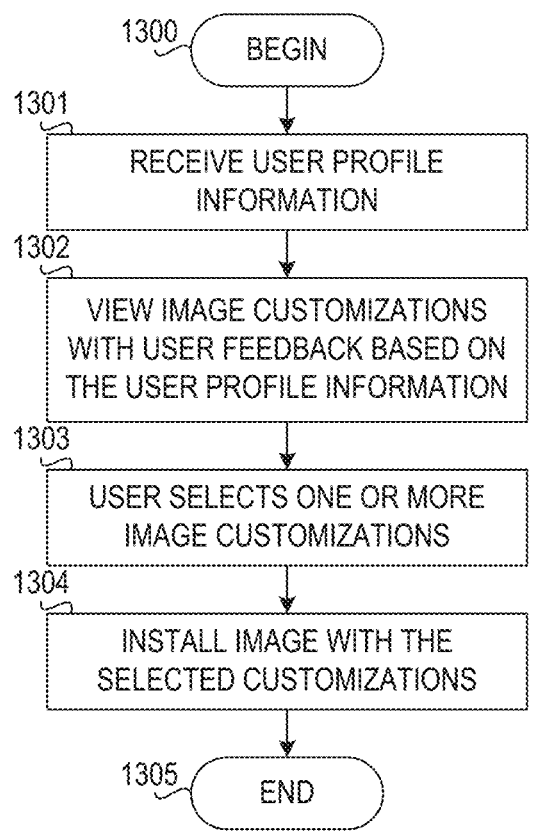

DYNAMIC CLOUD IMAGE UPDATES BASED ON SUBJECTIVE CUSTOMIZATION AND USER INPUT

BACKGROUND

The present application relates generally to an improved data processing apparatus and method and more specifically to mechanisms for dynamic image updates.

In computing, the term image is variously used to refer to several different categories of images including: (i) card image (that is, a character string that was, or could be, contained on a single punched card); (ii) disk image (that is, a computer file containing the complete contents and structure of a data storage device); (iii) ISO image (that is, an archive file (disk image) of an optical disc); (iv) RAM image (that is, a sequence of machine code instructions kept on ROM and moved to the RAM for use); (v) ROM image (that is, a computer file which contains a copy of the data from a read-only memory chip); (vi) single system image (SSI) (that is, a cluster of computers that appear to be a single computing system); (vii) system image (that is, the state of a computer or software system stored in some form); (viii) tape image (that is, an image of the contents of a computer's magnetic tape) and (ix) executable (that is, a computer file containing an executable program; short for "executable program image"). It is noted that the use of the word "image" herein does not refer to a graphic image (that is, a picture designed to be perceived by human vision).

Published US patent application, publication number 2009/0292737 states as follows: "A method for updating a plurality of disk images, each of the plurality of disk images derived from a common base disk image and a delta image comprising a plurality of delta files, includes applying a delta file to a base disk image to generate a second disk image comprising a portion of the base disk image modified by the delta file and an unmodified portion of the base disk image. Each delta file represents at least one difference between one of the plurality of user disk images and the base disk image. The method includes applying a patch to a copy of the base disk image, and determining that the patch is applied to a portion of the base disk image corresponding to the unmodified portion of the base disk image. The delta file is applied to the patched copy of the base disk image."

Cloud computing is a type of Internet-based computing that provides shared computer processing resources and data to computers and other devices on demand. It is a model for enabling ubiquitous, on-demand access to a shared pool of configurable computing resources (e.g., computer networks, servers, storage, applications, and services), which can be rapidly provisioned and released with minimal management effort. Cloud computing and storage solutions provide users and enterprises with various capabilities to store and process their data in third-party data centers that may be located far from the user-ranging in distance from across a city to across the world. Cloud computing relies on sharing of resources to achieve coherence and economy of scale.

Though service-oriented architecture advocates "everything as a service" (with the acronyms EaaS or XaaS or simply aas), cloud-computing providers offer their "services" according to different models, of which the three standard models per the National Institute of Standards and Technology (NIST) are Infrastructure-as-a-Service (IaaS), Platform-as-a-Service (PaaS), and Software-as-a-Service (SaaS). These models offer increasing abstraction; they are thus often portrayed as layers in a stack: infrastructure-, platform- and software-as-a-service, but these need not be related. For example, one can provide SaaS implemented on physical machines (bare metal), without using underlying PaaS or IaaS layers, and conversely one can run a program on IaaS and access it directly, without wrapping it as SaaS.

The NIST's definition of cloud computing defines the service models as follows:

Software as a Service SaaS)). The capability provided to the consumer is to use the provider's applications running on a cloud infrastructure. The applications are accessible from various client devices through either a thin client interface, such as a web browser (e.g., web-based email), or a program interface. The consumer does not manage or control the underlying cloud infrastructure including network, servers, operating systems, or storage, or even individual application capabilities, with the possible exception of limited user-specific application configuration settings.

Platform as a Service (PaaS). The capability provided to the consumer is to deploy onto the cloud infrastructure consumer-created or acquired applications created using programming languages, libraries, services, and tools supported by the provider. The consumer does not manage or control the underlying cloud infrastructure including network, servers, operating systems, or storage, but has control over the deployed applications and possibly configuration settings for the application-hosting environment.

Infrastructure as a Service (IaaS). The capability provided to the consumer is to provision processing, storage, networks, and other fundamental computing resources where the consumer can deploy and run arbitrary software, which can include operating systems and applications. The consumer does not manage or control the underlying cloud infrastructure but has control over operating systems, storage, and deployed applications; and possibly limited control of select networking components (e.g., host firewalls).

According to the Internet Engineering Task Force (IETF), the most basic cloud-service model is that of providers offering computing infrastructure—virtual machines and other resources—as a service to subscribers. Infrastructure as a service (IaaS) refers to online services that abstract the user from the details of infrastructure like physical computing resources, location, data partitioning, scaling, security, backup etc. A hypervisor or virtual machine monitor (VMM) runs the virtual machines as guests. Pools of hypervisors within the cloud operational system can support large numbers of virtual machines and the ability to scale services up and down according to customers' varying requirements. IaaS clouds often offer additional resources such as a virtual-machine disk-image library, raw block storage, file or object storage, firewalls, load balancers, IP addresses, virtual local area networks (VLANs), and software bundles.

IaaS-cloud providers supply these resources on-demand from their large pools of equipment installed in data centers. For wide-area connectivity, customers can use either the Internet or carrier clouds (dedicated virtual private networks). To deploy their applications, cloud users install operating-system images and their application software on the cloud infrastructure. In this model, the cloud user patches and maintains the operating systems and the application software. Cloud providers typically bill IaaS services on a utility computing basis: cost reflects the amount of resources allocated and consumed.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for use with a set of images including a first image, with each image of the set of images respectively representing a computer and respectively including software and configuration settings data. The method comprises deploying a plurality of first image instantiations of the first image for respective use by a plurality of users and tracking use of the plurality of first image instantiations to create a historical usage data set indicative of how the plurality of users are customizing the plurality of first image instantiations.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a block diagram illustrating operation of a crowd sourced image creation and deployment mechanism in accordance with an illustrative embodiment;

FIGS. 5A and 5B depict example interfaces for providing user feedback on custom images in accordance with an illustrative embodiment;

FIG. 6 depicts an example interface for providing feedback on deployable software configurations in accordance with an illustrative embodiment;

FIGS. 7A and 7B depict example interfaces for user profiles in accordance with an illustrative embodiment;

FIG. 8 depicts an example interface that shows user feedback results in accordance with an illustrative embodiment;

FIG. 10 is a flowchart illustrating operation of a crowd sourced image creation and deployment system in accordance with an illustrative embodiment;

FIG. 11 is a flowchart illustrating operation of a user client for crowd sourced image creation and deployment in accordance with an illustrative embodiment;

FIG. 12 is a flowchart illustrating operation of an interface for providing feedback on custom images in accordance with an illustrative embodiment; and FIG. 13 is a flowchart illustrating operation of a mechanism for searching images for deployment in accordance with an illustrative embodiment.

DETAILED DESCRIPTION

Figure 1:
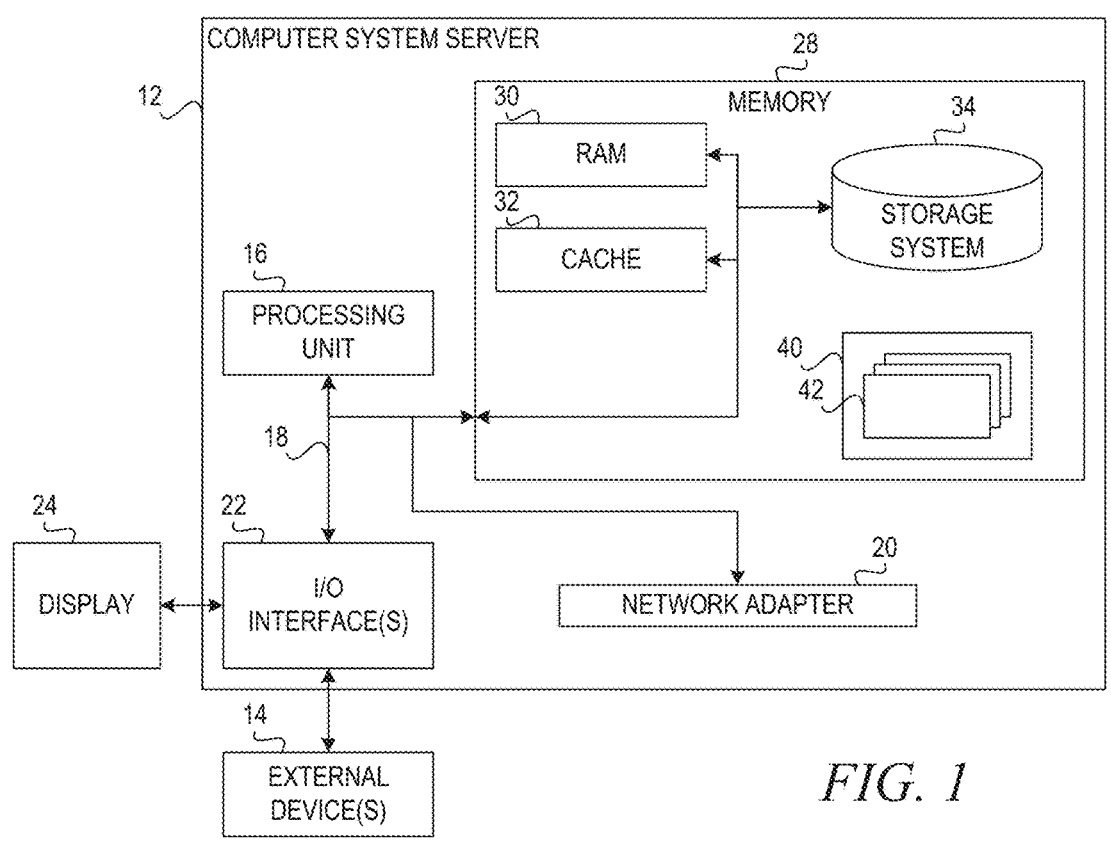
FIG. 1 depicts a cloud computing node according to an illustrative embodiment.

The customization of environments after the initial creation and deployment of a configuration provides much to learn and improve upon. Keeping track of what is customized in an image and how, and correlating that information to other criteria such as location, time, language, dialect, accessibility needs, etc., provide important information for future improvements and deployments. Enterprise cloud image deployments will be more common as storage costs decrease and network speeds increase.

The illustrative embodiments provide "smart provisioning" based on feedback derived from previous customization of environments. Examples include deployments of images to government agencies, where images are customized with increased security settings, images used by someone in a particular location, where language dialect settings are modified to improve communication, or images provided to a certain age demographic, such as a nursing home, where font size is increased and screen resolution is modified. Keeping track of this information will assist in improvements for future deployments and can also have important marketing applications from a business perspective.

As noted above in the Background section, there are many types of images as that term relates to computer data. Some embodiments of the present invention are specifically applicable to system images. A system image (as that term is used herein) includes configurable system resources, such as hardware, operating system, network configurations, and all software applications including any customized configuration settings for each of the above categories that enhance performance, reliability, security, and usability of the whole system. Custom configuration settings may include language preference, dialect, accessibility settings, or security settings.

Some embodiments of the present invention may recognize one, or more, of the followings challenges, problems, shortcomings and/or opportunities for improvement with respect to the current state of the art: (i) some currently conventional approaches focus on the mechanisms of how to maintain a plurality of images using delta file changes without continuously improving the base image; and/or some currently conventional approaches do not consider suitability of images for a given user based on the role of the given user.

Some embodiments of the present invention may include one, or more, of the following operations, characteristics, features and/or advantages: (i) continuously improve an initial base image by creating one or more derived images based on popularity/desirability feedback received from the users of custom images; and/or (ii) continuously improve an initial base image by taking into consideration which image is most suited to a user, based on the roles of the user.

Some embodiments of the present invention may include one, or more, of the following operations, characteristics, features and/or advantages: (i) a method for use with a set of image(s) including a first image, with each image of the set of image(s) respectively representing a computer (such as a virtual machine) and respectively including software and configuration settings data; (ii) deploying a plurality of first image instantiations of the first image for respective use by a plurality of users; (iii) tracking use of the plurality of first image instantiations to create a historical usage data set indicative of how the plurality of users are customizing the plurality of first image instantiations (these customizations are sometimes called "deltas"); (iv) the historical usage data set further includes information indicative of at least one of the following types of customization: additional software added, software removed, user customization such as screen size, language packs resolution; mouse settings, power settings; (v) the historical usage data set further includes information indicative of characteristics of the plurality of users who make customizations; (vi) the characteristics of the plurality of users who make customizations includes information relating to at least one of the following types of user characteristics: users that travel frequently, users that work in low light settings, users are in the field, users in a particular geographic location; (vii) voting on deltas by users and/or potential users; (viii) searching on the deltas; (ix) surveys relating to the deltas; and/or (x) the tracking includes three (3) core levels of monitoring for deltas as follows: (a) user preferences (e.g., font, language, power settings, network settings, display, etc.), (b) installed/uninstalled software programs (e.g., Eclipse, Java, Notes), and (c) specific application customization (e.g., WAS mem heap size, ports, SSL).

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" regarding features and elements of the illustrative embodiments. It should be appreciated that these terms and phrases are intended to state that there is at least one of the feature or element present in the illustrative embodiment, but that more than one can also be present. That is, these terms/phrases are not intended to limit the description or claims to a single feature/element being present or require that a plurality of such features/elements he present. To the contrary, these terms/phrases only require at least a single feature/element with the possibility of a plurality of such features/elements being within the scope of the description and claims.

Moreover, it should be appreciated that the use of the term "engine," if used herein regarding describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine-readable memory and executed by the processor. Further, any name associated with an engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
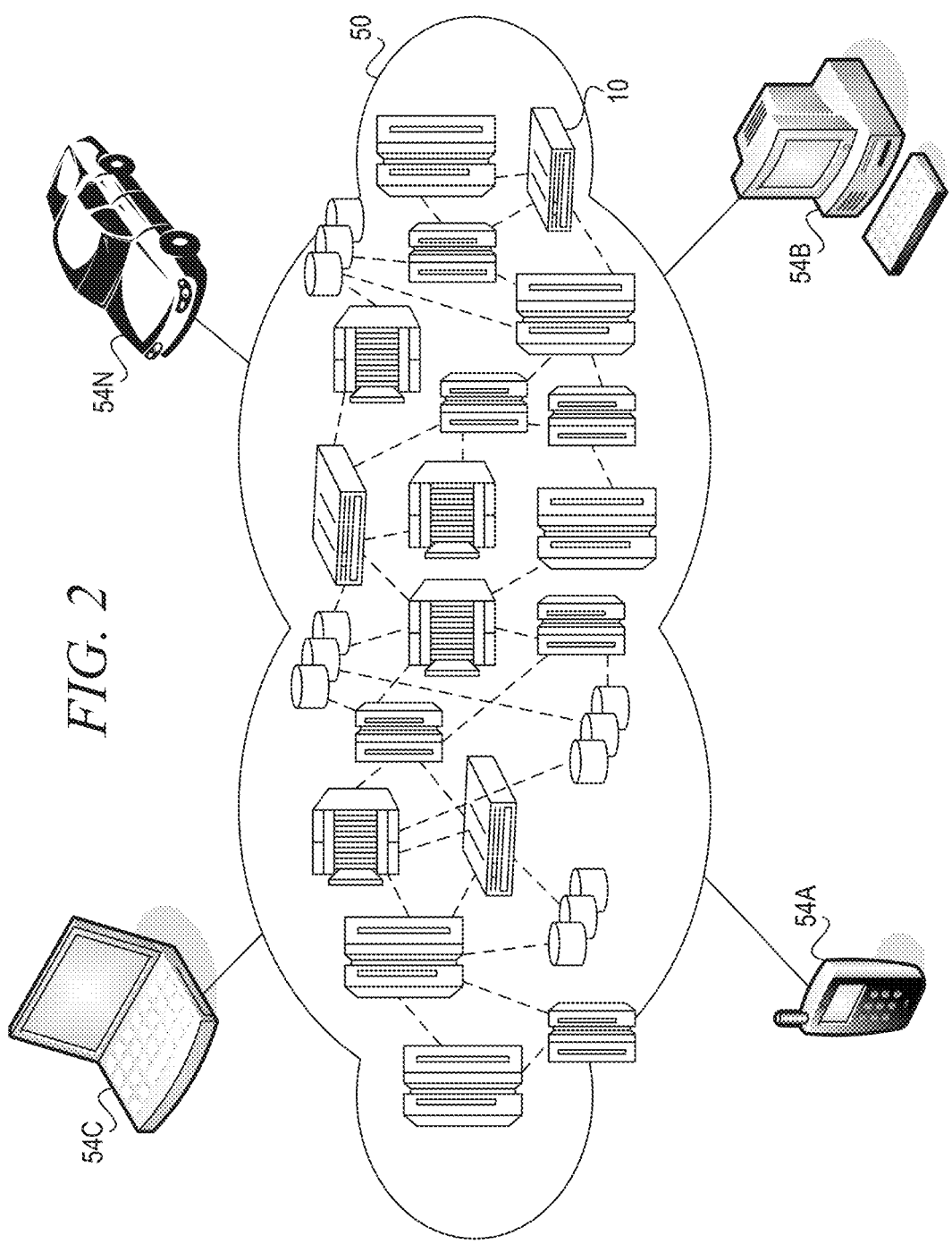
FIG. 2 depicts a cloud computing environment according an illustrative embodiment.
Figure 3:
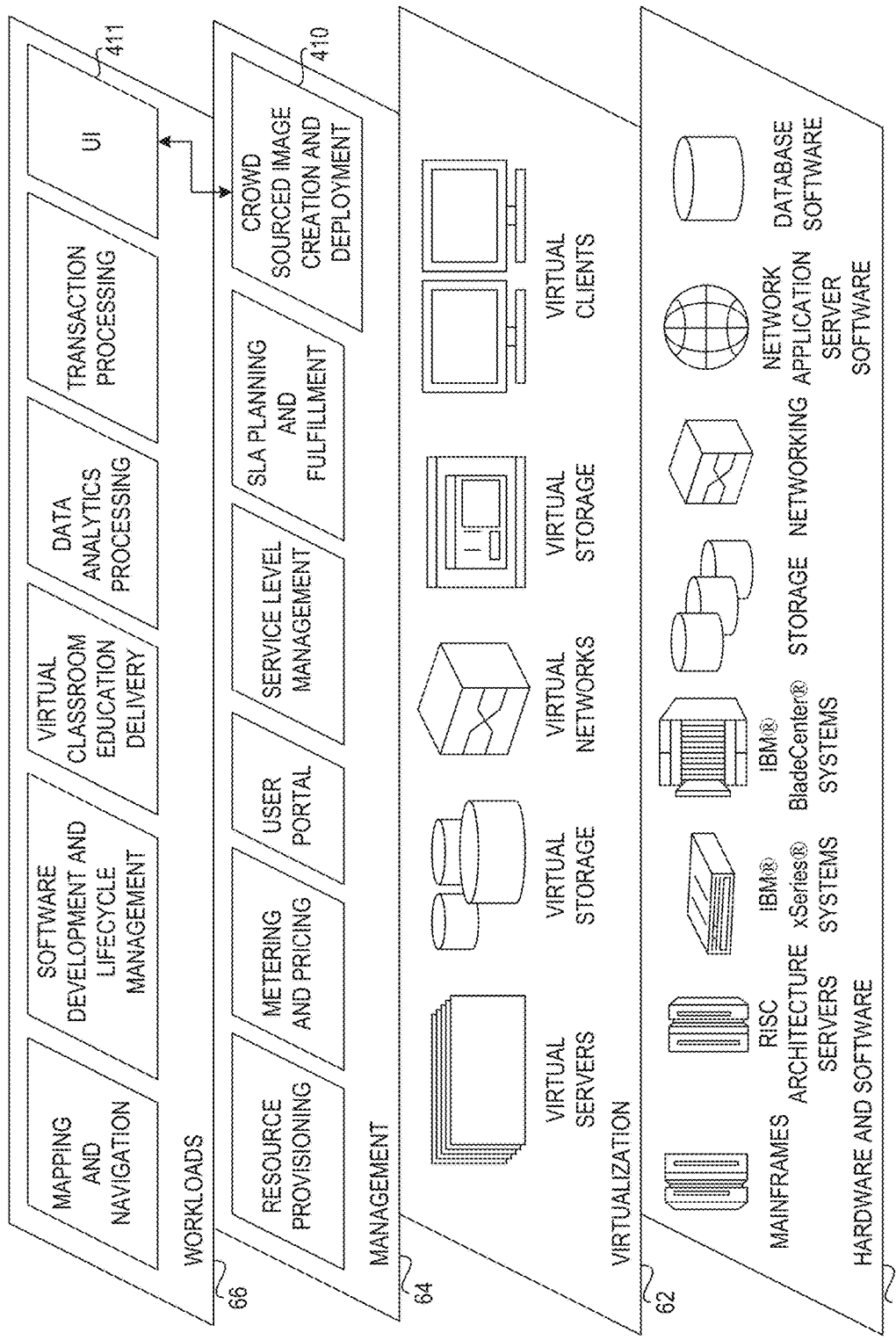
FIG. 3 depicts abstraction model according to an illustrative embodiment.

The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation regarding the environments in which aspects or embodiments of the present invention may be implemented. Many modifications to the depicted environments may be made without departing from the spirit and scope of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

In accordance with the illustrative embodiment, management layer 64 includes crowd sourced image creation and deployment mechanism 410, which provides images for customer machines, virtual machines, or execution environments. Each image has built-in instrumentation that allows further customization by the user to be tracked and sent back to crowd sourced image creation and deployment mechanism 410. As used herein, an image refers to an image used to deploy or install a user environment on a user's physical machine or in the cloud. In one example embodiment, an image may be used to install a virtual machine within an Infrastructure-as-a-Service model.

In addition, crowd sourced image creation and deployment mechanism 410 may compile these customizations and create custom images to be downloaded by users through a user interface (UI) 411. Users may also provide feedback, such as votes or ratings, through UI 430. Subsequently, users may browse custom images with user-provided votes, ratings, or reviews through UI 430. The custom images may include full user environment images and/or "deltas" (i.e., changes) that include changes to the user environment, such as added software or configurations.

Figures 4, 5A:
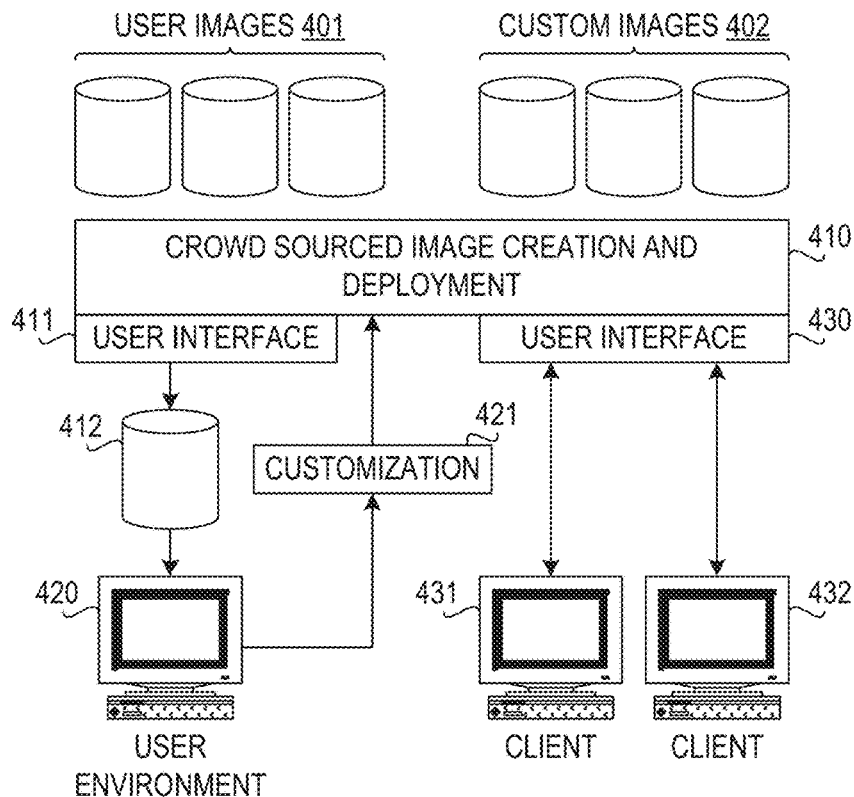

FIG. 4 is a block diagram illustrating operation of a crowd sourced image creation and deployment mechanism in accordance with an illustrative embodiment. Crowd sourced image creation and deployment mechanism 410 deploys an image 412 from user images 401 to user environment 420 based on a current base set of software, hardware, and configuration, based on initial understanding or a request from a user. Image 412 includes built-in customization instrumentation 421, which allows further customization to be tracked and sent back to crowd sourced image creation and deployment mechanism 410 for feedback and optimization.

Customization instrumentation 421 performs frequent scanning of the system to detect changes and updates and sends an output file listing the deltas to crowd sourced image creation and deployment mechanism 410. Image creators may view these output files for assessment and monitoring. Crowd sourced image creation and deployment mechanism 410 also provides custom images 402 based on the deltas in the output files to be viewed through user interface 430. Users and clients 431, 432 may view custom images 402, install or deploy them in user environments, and provide feedback with votes or ratings through user interface 430. Thus, users have the opportunity to vote or rate the deltas that they find most beneficial for their own use. This crowd sourcing aspect allows image creators to determine what would be the most beneficial updates to incorporate into the base user images 401 and to produce frequent "updates" or "branches" from the original images 401 for users to download and benefit from.

Three core levels of deltas may occur:
1. User preferences (e.g., font, language, power settings, network settings, display resolution, etc.).
2. Installed and uninstalled software programs (e.g., integrated development environments (IDEs), software platforms, communication platforms, etc.).
3. Application customization (e.g., memory heap size, ports, cryptographic protocols enabled, etc.).

As an example usage model, consider a college dormitory where the majority of residents are either architecture or engineering students. A common image may be provided to all students with some basic common requirements. Students studying architecture make changes the image to support their interests and area of study. These could include basic operating system customizations and additional software installations. Other students studying architecture may be interested in the changes that were made by other students to the image and are able to view these customizations in a centralized repository that shows the base image requirements plus the deltas made by other students. The students making the changes can upload their images to the repository (i.e., custom images 402) if they feel that it may be useful to other students studying architecture. Students will see these customized images 402 and can download them for their own use.

The image creators responsible for creating the initial base images may use statistics and the instrumentation to determine the most popular or frequently downloaded images, determine what was added, and produce an improved image for architecture students. The statistics may include user profile statistics. Image creators can use analytics to determine which users are most likely to use particular custom images and deltas.

As another example, consider a hospital where a base image is created for the majority of the administration staff to use. Depending on the role (doctor, nurse, billing, etc.), customizations are made based on preferences and commonality of role usage. This could further extend to the specialty or field of the doctor (e.g., oncology vs. neurology). Similar to the above example, images can be uploaded after customization for other users to use. The most frequent downloads of customized images indicate the need for an updated base image according to usage. Crowd sourced image creation and deployment mechanism 410 then provides the updated images 401.

Other examples include, but are not limited to, demographics, age, industry, academics, and any other specialty interest.

FIGS. 5A and 5B depict example interfaces for providing user feedback on custom images in accordance with an illustrative embodiment. As shown in FIG. 5A, an interface for providing feedback for a delta adding software to a user environment is shown. The user may rate a plurality of categories 501. The user may provide feedback on a scale of five stars where five stars indicate the best rating. Alternatively, the user may provide a rating as thumbs up/down, a percentage, or the like. The user may also provide a written review for the other users to view.

FIG. 5B shows another example interface for providing feedback for a delta adding software to a user environment. The user rates a plurality of categories 502. The categories may include, for example, performance and responsiveness, user interface customizations, tool plugin configuration, design templates installed, security updates, driver updates, protocol configurations, etc.

In one embodiment, survey questions 501, 501 are shown to a user once monitoring on the client image determines that the user has utilized a particular aspect of the system enough that the user is familiar with it and can vote on the usefulness of that component. For instance, the system may present a survey on a tool used among engineers or a tool used by both architecture and engineering students, or a survey on the operating system in general, etc.

The questions in the survey 501, 502 can be associated with specific configuration settings that can be changed by a user and monitored by the mechanism of the illustrative embodiments. For example, the "performance and responsiveness" survey question is related to tuning memory usage and other settings that would affect the performance of the software. The "user interface customizations" question in the survey would relate to changes in font sizes and other UI elements of the component. Questions could be tailored for each configurable software component based on what is configurable for that component.

FIG. 6 depicts an example interface for providing feedback on deployable software configurations in accordance with an illustrative embodiment. The rating process allows a user to browse through a description of all available software configurations that are in a library of software configurations, as described in item field 601. The user may vote or rate software configurations in field 602 based on descriptions of the configurations as key changes made in field 603. The user may vote on images or software configurations even if the user has not actively used that software configuration. On the other hand, surveys as shown in FIGS. 5A and 5B present questions to users who are actively using the software configuration.

The virtual machine configuration will be stored in flat tiles that list the various features associated with preferred customization. Subject matter experts and long-term users of certain virtual machines will have their configuration files stored on a central repository server and displayed for other end users (clients) to vote on. The vote can either be on the separate features of the image or the image in its entirety.

The user can browse through items for which a vote or rating can be cast. There may be some items for which the user has not yet cast a vote (neither good nor bad), and the system lists those with a star rating that is not yet filled in with solid stars. Items for which a vote has been cast have star ratings that are filled in.

FIGS. 7A and 7B depict example interfaces for user profiles in accordance with an illustrative embodiment. The system can be used without categorizing users into profile groups, but when a user's profile is known, the system can potentially help a user hone in on software customizations that are preferred by similar users. Cohorts of similar users can include groups or clusters such as architecture students, engineering students, sales team members, etc.

Each user has a profile, which could either be determined automatically based on information known of the user (e.g., job role in the human resources database, college major and minor, etc.), or the profile can be completed by a user through a series of questions asked of the user. The profile could be updated over time. The user's profile can be utilized when the user completes surveys or votes on virtual machine images. Similar profile votes can be grouped together. For instance, the system may have many profiles for architecture students that share a common use case, and another set of profiles of engineering students that share a different use case.

FIG. 8 depicts an example interface that shows user feedback results in accordance with an illustrative embodiment. The interface shows the item being rated 801, the rating given 802, the user providing the rating 803, the type of feedback 804, and the date of feedback 805.

Figure 9:
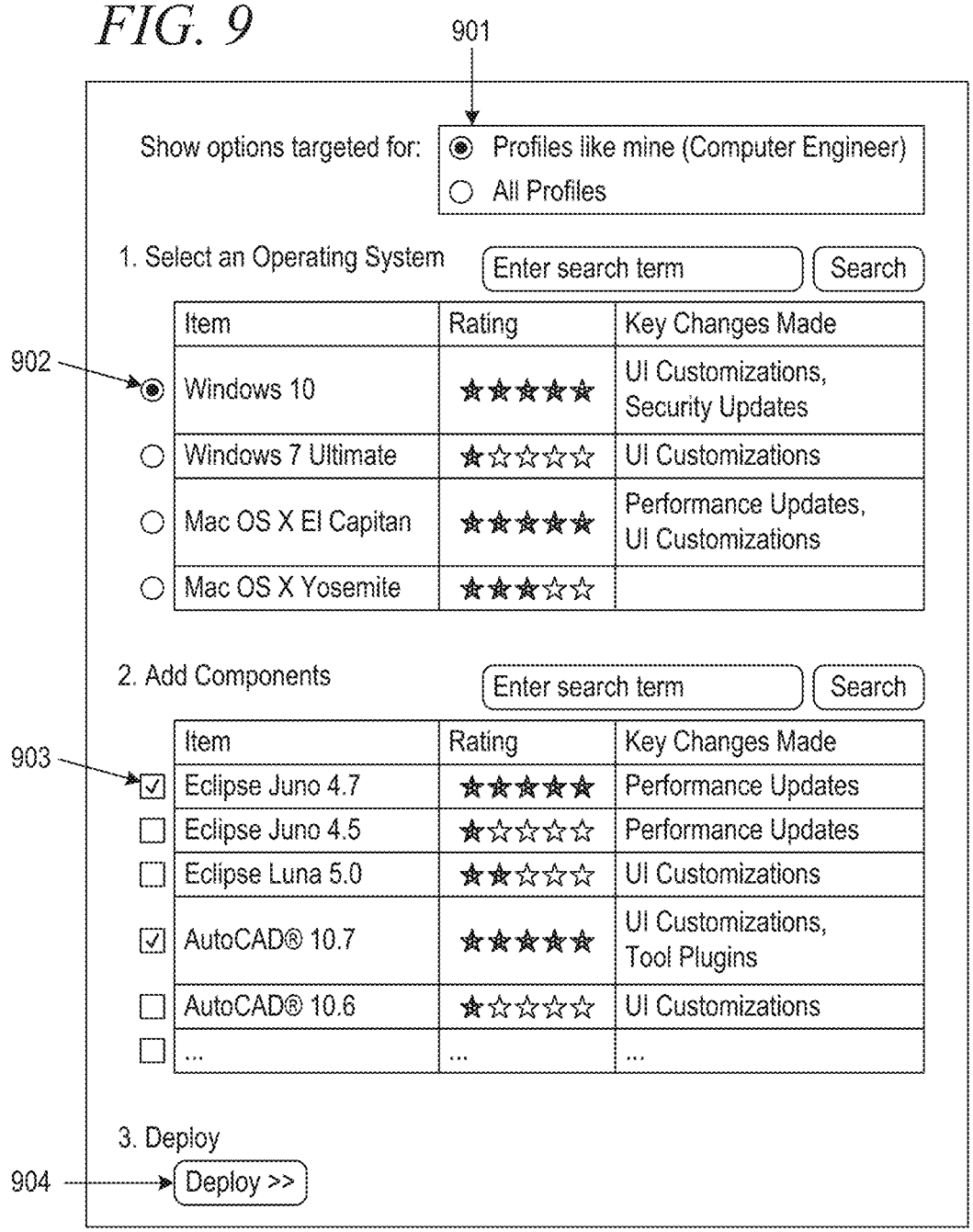
FIG. 9 depicts an example interface for interactive searching and search result tables for a user to select deployment options based on the survey results in accordance with an illustrative embodiment.

FIG. 9 depicts an example interface for interactive searching and search result tables for a user to select deployment options based on the survey results in accordance with an illustrative embodiment. In field 901, the user can specify whether the search is to include profiles based on a cluster or cohort of similar users or all users. The user selects an operating system by selecting a radio button control 902. The user can base this selection on user ratings and key changes made.

Then, the user adds components using checkboxes 903. Again, the user can base the selection of components based on user ratings and key changes made. Finally, the user can select button 904 to deploy an image with the selected operating system and the added components.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the tatter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 10 is a flowchart illustrating operation of a crowd sourced image creation and deployment system in accordance with an illustrative embodiment. Operation begins (block 1000), and the system builds configuration instrumentation into based images to be deployed to users (block 1001). The system deploys the base images to the users (block 1002) and receives customization output files from the customization instrumentation (block 1003). The system calibrates a base image to update the base image or provides a customized image based on the output files received from the customization instrumentation (block 1004).

The system then provides the updated base images and customized images to users (block 1005). The system also provides a feedback interface for users to rate the images (block 1006). The system receives user feedback with associated user profile information (block 1007). The system presents the images and compiled feedback to users based on each user's profile information (block 1008). Thereafter, operation ends (block 1009).

FIG. 11 is a flowchart illustrating operation of a user client for crowd sourced image creation and deployment in accordance with an illustrative embodiment. Operation begins (block 1100), and the user installs an image with customization instrumentation (block 1101). The image may be installed on a user's physical machine or in cloud-based user environment or virtual machine. The user customizes the image (block 1102), and the instrumentation built into the image sends customization output files to the crowd sourced image deployment and customization system (block 1103). Thereafter, operation ends (block 1104).

FIG. 12 is a flowchart illustrating operation of an interface for providing feedback on custom images in accordance with an illustrative embodiment. Operation begins (block 1200), and the user installs a base or customized image (block 1201). The user is presented with a feedback interface (block 1202) and receives user feedback through the interface (block 1203). Then, the interface sends the user feedback to the crowd sourced image deployment and customization system (block 1204). Thereafter, operation ends (block 1205).

FIG. 13 is a flowchart illustrating operation of a mechanism for searching images for deployment in accordance with an illustrative embodiment. Operation begins (block 1300), and the mechanism receives user profile information (block 1301). The user views image customizations with user feedback based on the user profile information (block 1302). The user selects an operating system and one or more image customizations (block 1303). The mechanism then installs the image with the selected customizations (block 1304). Thereafter, operation ends (block 1305).

In one embodiment of the invention, image customization data is stored as a table constituting a body of a relational database. Alternatively and/or additionally, other storage techniques could be used to store the historical image customization data, such as: blockchain, self-referential database, storing entries (corresponding to unique customizations or unique instances of customizations)) as URL addressable entries on the internet, use of RAID storage array hardware, use of database management system (DBMS, commercially available or custom designed), SQL queryable, XML queryable and/or NoSQL queryable.

In one embodiment, custom data may be stored in an object-oriented database with one object for each customized image and all the data associated with the image stored as object attributes. The attributes may be a single value, multi-valued, or multilevel nested object. Alternatively, the custom data may also be stored as values in configuration files stored on disk, without even persisting them to a database.

The table of the body of the relational database embodiment currently under discussion includes one record (or row) for each instance of each customization. Alternatively, some embodiments may only include one record for each customization.

Each record of the table of the body of the relational database embodiment currently under discussion includes machine readable data values for each of the following fields (or column headers): (i) identification of the files used in instantiating the customized image and the repository or logical location from which the files used to instantiate the custom image were retrieved; (ii) date and time of instantiation; (iii) period(s) over which the instantiation has operated; (iv) reason for using the customization; (v) identification of the hardware on which the customized image was used; (vi) identification of software and/or firmware used to run the instantiation of the customized image; (vii) identification of software from which the instantiation of the customized image received input data; (viii) identification of software to which the instantiation of the customized image sent output data; (ix) identification of other software running on hardware used to run the instantiation during the period(s) over which the instantiation operated; (x) identity of the person(s) responsible for choosing the instantiation and getting it instantiated; (xi) attributes of the person(s) responsible for choosing the instantiation and getting it instantiated; (xii) review of the performance of the instantiation by the person(s) responsible for choosing the instantiation and getting it instantiated; (xiii) identity of the person(s) who used the instantiation; (xiv) attributes of the person(s) who used the instantiation; (xv) review of the performance of the instantiation by the person(s) who used the instantiation; (xvi) known performance issues with the customized image; (xvii) amount of computer and/or communication resources required to reliably run the customized image; (xviii) amount of computer and/or communication resources actually used by the instantiation of the customized image; (xix) review information of the customized image by third parties; (xx) identity and attributes of the enterprise on whose behalf the instantiation was used; (xxi) programming languages used by the customized image; (xxii) natural languages used by the customized image; (xxiii) identity of enterprise that supplied the customized image; (xxiv) cost charged for use of the instantiation; (xxv) physical and logical location of the hardware where the instantiation was run; (xxvi) physical and location(s) of the hardware with which the instantiation communicated data; (xxvii) cultural information (for example, most common natural language) of the physical location of the hardware on which the instantiation was run; (xxviii) at the application level and system level local time; (xxix) language preference including dialects; (xxx) audio/video settings; monitor brightness; (xxxii) color settings; (xxxiii) font style and size settings; (xxxiv) memory, disk, and network configuration; (xxxv) how often the system should check the customization database to see if newer versions of the base images are available; (xxxvi) password rules; and, (xxxvii) how many instances of an application can be launched simultaneously. Other embodiments of historical customized image stores may include more fields, fewer fields and/or other field of historical data. Some of the fields in the foregoing list will be further discussed in the following paragraphs.

With respect to item (i), identification of the files used in instantiating the customized image, it is noted that a customized image file includes a set of base image file(s) and may further include patch file(s). Common file types for base image files include the .ISO file type, for example. However, the illustrative embodiments focus on user experience of a custom image or environment and not specifically on a particular file type. While .ISO would be one of the embodiments, other commercial or proprietary file formats could be used to save a particular environment and recreate the environment for the user. The illustrative embodiments would not use graphical image file types, such as .VMDK, .JPG, etc., for storing customized system images. Common file formats for patch files typically include the .patch tile type in the UNIX operating system or the MCE file type in the Microsoft Windows® operating system, for example. Any file type used for patching the system image may be used within the scope of the present invention. Patches may include, for example, hotfix or Quick Fix updates, point releases, program temporary fix, security patches, service packs, or unofficial patches. The set of base file(s) and patch file(s) (if any) that make up the particular customized image file may be assigned a commonly used alphanumeric string identifier, such as a unique customized image name.

With respect to field (iv), reason for using the customization, this may be supplied, for an example, by an IT employee working for an enterprise. With respect to item (v), identification of the hardware on which the customized image was used, this may be as simple as identifying a single, traditional standalone computer. On the other hand it may involve identification of distributed hardware, such as the case where the customized image is instantiated and used in a cloud. The hardware may, include processors, storage hardware and/or data communication hardware, With respect to field (vi), identification of software and/or firmware used to run the instantiation of the customized image, this may include, for example, an identification of type and version of an operating system used to run the instantiation of the customized image.

With respect to field (x), identity of the person(s) responsible for choosing the instantiation and getting it instantiated, this may be supplied, for an example, by an IT employee working for an enterprise.

With respect to field (xi), attributes of the person(s) responsible for choosing the instantiation and getting it instantiated, it can be helpful to know, for example, an experience level of an IT person who chose the customized image to use.

With respect to field (xii), review of the performance of the instantiation by the person(s) responsible for choosing the instantiation and getting it instantiated, this may refer to an up-or-down vote, a set of number grades), a set of letter grade(s), or explanatory text written in a natural language (hut stored a machine readable data in the database, of course).

With respect to field (.civ), attributes of the person(s) who used the instantiation, this may include, for example, the user's job function and experience level.

With respect to item (xix), review information of the customized image by third parties, this refers to other parties who have set up and/or used other instantiations of the same customized image. This field may include links to other records in the database where this information would be stored under the respective rubrics of their respective instantiations.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions, Thus, the illustrative embodiments provide mechanisms for dynamic cloud image updates based on subjective customization and user input. After providing an image, the system monitors customizations that occur after the initial image creation. This would be used to produce improved image deployments for individuals moving forward. This provides constant improvements based on usage and non-usage of software installed. The system monitoring may determine whether the virtual image is undersized or oversized in terms of memory, disk, and other resources based on typical usage by consumers of the image. The template image may be updated or calibrated based on this real-time monitoring so that future image allocation can use the updated image. The system provides images that are customized for geographic location and culture.

In one embodiment, the system provides server-side environments customized for groups of users. Some software uses server-side components. The virtual image allocated to a user may only contain client-side software, and it points to the cloud for the server-side application programming interface (API). Due to network bandwidth, network connectivity, or other reasons, the server-side components may be allocated in multiple geographies, and different groups of users would get images that automatically point to the optimal server. For instance, a group of users in a remote part of Africa may be pre-allocated their own server-side components that are local to them and do not require a fast wide area network connection; rather, just a fast local network connection is needed to the server. The illustrative embodiments provide the ability to tailor images based on environmental restrictions. (e.g., a slow network would lead to a streamlined image; a noisy environment would automatically enable subtitles, etc.).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for use with a set of images, with each image of the set of images respectively representing a computer and respectively including software and configuration settings data, the method comprising:
   deploying, by a crowd-sourced user environment image creation and deployment system executing on at least one processor of a data processing system, a plurality of first image instantiations of a base user environment image for respective use by a plurality of users to install a plurality of user environments, wherein the base user environment image has built-in instrumentation that scans for user customizations on the base user environment image and sends customization output files to the crowd-sourced user environment image creation and deployment system and wherein the set of user environments comprises a set of installation images for physical computing devices or deployment images for virtual machine environments;
   receiving, by the crowd-sourced user environment image creation and deployment system, a set of output files from the built-in instrumentation in the plurality of user environments, wherein the set of output files list changes resulting from the user customizations to the set of user environments;
   tracking, by the crowd-sourced user environment image creation and deployment system, use of the plurality of first image instantiations to create a historical usage data set indicative of how the plurality of users are customizing the plurality of first image instantiations based on the set of output files received from the built-in instrumentation; and
   generating, by the crowd-sourced user environment image creation and deployment system, at least one updated base user environment image based on the set of output files and user feedback.

2. The method of claim 1, wherein the historical usage data set includes information indicative of at least one of the following types of customization: additional software added, software removed, user customization such as screen size, language packs resolution, mouse settings, power settings.

3. The method of claim 1, wherein the historical usage data set further includes information indicative of characteristics of the plurality of users who make customizations.

4. The method of claim 3, wherein the characteristics of the plurality of users who make customizations includes information relating to at least one of the following types of user characteristics: users that travel frequently, users that work in low light settings, users are in the field, users in a particular geographic location.

5. The method of claim 1, further comprising at least one of the following:

voting on deltas;
searching on the deltas; and
surveys relating to the deltas.

6. The method of claim 1, wherein the tracking includes three (3) core levels of monitoring for deltas as follows:
   user preferences;
   installed and uninstalled software programs; and
   specific application customization.

7. The method of claim 1, wherein the changes resulting from the user customizations comprise at least one of software added, software removed, screen size adjustment, language pack resolution, mouse settings, or power settings.

8. The method of claim 1, wherein the set of output files includes information indicative of characteristics of the set of users who make the customizations.

9. The method of claim 8, wherein the characteristics of the set of users who make the customizations include information relating to at least one of users that travel frequently, users that work in low light settings, users are in the field, or users in a particular geographic location.

10. The method of claim 1, wherein generating the at least one updated base user environment image comprises:
    generating a user interface presenting the changes resulting from the user customizations to the set of user environments; and
    receiving the user feedback on the changes resulting from the user customizations to the set of user environments.

11. The method of claim 10, wherein the user feedback comprises at least one of votes, ratings, reviews, or surveys.

12. The method of claim 1, wherein the instrumentation tracks changes to at least one of user preferences, installed and uninstalled software programs, or specific application customizations.

13. The method of claim 1, further comprising:
    generating a search interface presenting available custom operating system environments and customizations with ratings based on the user feedback;
    receiving from a given user a selection of a custom operating system environment and at least one customization; and
    deploying to the given user a custom user environment image based on the selected custom operating system environment and the selected at least one customization.

14. A computer program product comprising a non-transitory computer readable storage medium having a computer readable program stored therein, wherein the computer readable program, when executed on at least one processor of a data processing system, causes the computing device to implement a crowd-sourced user environment image creation and deployment system, wherein the computer readable program causes the data processing system to:
    deploy, by the crowd-sourced user environment image creation and deployment system, a plurality of first image instantiations of a base user environment image for respective use by a plurality of users to install a plurality of user environments, wherein the base user environment image has built-in instrumentation that scans for user customizations on the base user environment image and sends customization output files to the crowd-sourced user environment image creation and deployment system and wherein the set of user environments comprises a set of installation images for physical computing devices or deployment images for virtual machine environments;
    receiving, by the crowd-sourced user environment image creation and deployment system, a set of output files from the built-in instrumentation in the plurality of user environments, wherein the set of output files list changes resulting from the user customizations to the set of user environments;
    track, by the crowd-sourced user environment image creation and deployment system, use of the plurality of first image instantiations to create a historical usage data set indicative of how the plurality of users are customizing the plurality of first image instantiations based on the set of output files received from the built-in instrumentation; and
    generate, by the crowd-sourced user environment image creation and deployment system, at least one updated base user environment image based on the set of output files and user feedback.

* * * * *